United States Patent [19]
Wilkins

[11] Patent Number: 6,003,604
[45] Date of Patent: Dec. 21, 1999

[54] SUBSEA WELLHEAD CONNECTION ASSEMBLY AND METHOD OF INSTALLATION

[75] Inventor: Robert Lee Wilkins, Houston, Tex.

[73] Assignee: Kraerner Oilfield Products, Houston, Tex.

[21] Appl. No.: 09/057,737

[22] Filed: Apr. 9, 1998

[51] Int. Cl.⁶ ................................................. E21B 7/12
[52] U.S. Cl. .................. 166/366; 166/338; 166/344; 285/146.2; 285/261
[58] Field of Search ..................................... 166/338, 339, 166/340, 344, 345, 363, 366; 285/146.2, 261, 121.7

[56] References Cited

U.S. PATENT DOCUMENTS

| | | | |
|---|---|---|---|
| 3,589,441 | 6/1971 | Brown | 166/366 X |
| 3,695,633 | 10/1972 | Hanes | 166/340 X |
| 3,881,549 | 5/1975 | Thomas | 166/366 X |
| 3,913,668 | 10/1975 | Todd et al. | 285/261 X |
| 4,452,312 | 6/1984 | Roblin | 166/339 |
| 4,618,173 | 10/1986 | Dopyera et al. | 285/261 |
| 4,632,432 | 12/1986 | Reneau | 285/261 X |
| 4,822,212 | 4/1989 | Hall et al. | 166/366 X |

*Primary Examiner*—Dennis L. Taylor
*Attorney, Agent, or Firm*—Wendy Buskop; Bayko Gibson et al.

[57] ABSTRACT

A method for connecting a subsea wellhead to a subsea manifold by an articulated flowline comprised of a plurality of flowline segments joined in series by adjustable ball joint connectors each of which comprises a plurality of bolts for clamping the joined segments in a fixed position and means for stretching the bolts by applying a force which does not exceed the yield strength of the bolts to loosen the connection. The method includes attaching one end of the flowline to an outlet of the wellhead, adjusting each of the ball joint connectors to configure the flowline as necessary for attaching the other end of the flowline to the manifold, and attaching said other end of the flowline to the manifold.

4 Claims, 6 Drawing Sheets

SUBSEA WELLHEAD CONNECTION ASSEMBLY AND METHOD OF INSTALLATION

FIELD OF THE INVENTION

This invention relates to a subsea wellhead connection assembly for establishing fluid communication and production capability between a subsea wellhead and an adjacent manifold system and more particularly, a method for installing the connection in a subsea well completion system for multiple offshore template-drilled wells.

BACKGROUND OF THE INVENTION

The development of oil and gas fields in deep waters such as several hundred to several thousand meters typically requires the drilling of multiple wells through a template secured to the marine floor. The template serves as a base for the mounting of multiple wellheads and well completion systems. For each well, the production and control flowlines for the well are connected to a manifold by a separate wellhead connection assembly which is lowered into place from a surface vessel and installed by remote control means.

A modularized system known as the Hinged-Over Subsea Template or "Host" has recently been developed which includes a base template adapted for mounting on a Foundation System designed for the specific subsea soil conditions. The Host system comprises a set of building blocks which include the base template, a manifold, a manifold impact protection system, a control system, various tie-in systems and modules, and a plurality of Hinged-Over Guidance Structures or "HOGS" which are pivotally mounted on the template and adapted to be folded out on the marine floor to serve as guides through which the wells are drilled and wellheads established.

With the HOST system as described, the entire system must be developed and manufactured before lowering to the sea floor so as to insure that its various building blocks and assembled systems are connected and are in working order. Because of the great depths and associated problems of guiding the assemblies into position and such factors as different soil conditions under the Hinged-Over Guidance Structures, the precise orientation of the various components for accommodating installation of the various wellhead systems becomes a difficult task and may require multiple time-consuming attempts for alignment positioning. Further, where there is a misalignment of an inlet member with an outlet member, such as a wellhead and wellhead Christmas Tree assembly with respect to the manifold, the installation of a connector assembly for establishing communication between the wellhead and the manifold may require customizing the manufacture of the connector and flowline parts for initial connection and for any subsequent adjustment of the flowline.

SUMMARY OF THE INVENTION

The invention is a method for connecting a subsea wellhead to a subsea manifold by means of an articulated adjustable flowline comprised of a plurality of flowline segments which are serially connected by adjustable ball joint connectors, each of which segments has a passage extending therethrough from end to end and each of which connectors includes a plurality of bolts for joining the flanged end of one segment to hold the segments in a fixed position and means for selectively applying a force which does not exceed the yield strength of the bolts to stretch the bolts to thereby loosen the connection and allow a re-positioning of the joined segments so they may be fixed in a new orientation when the force is removed. The method includes providing the articulated flowline, attaching one end of the flowline to an outlet of the wellhead, adjusting each of the ball joint connectors to configure the flowline as necessary for attaching the other end of the flowline to the manifold, and attaching said other end of the flowline to the manifold.

DETAILED DESCRIPTION OF THE INVENTION

The flowline used in the invention to connect the subsea wellhead to an adjacent subsea manifold is comprised of a plurality of flowline segments which are serially connected by articulated ball joint connector apparatus 10, each of which connects a pair of flowline segments in an adjustable fluid-tight sealing relationship.

Figure 3:
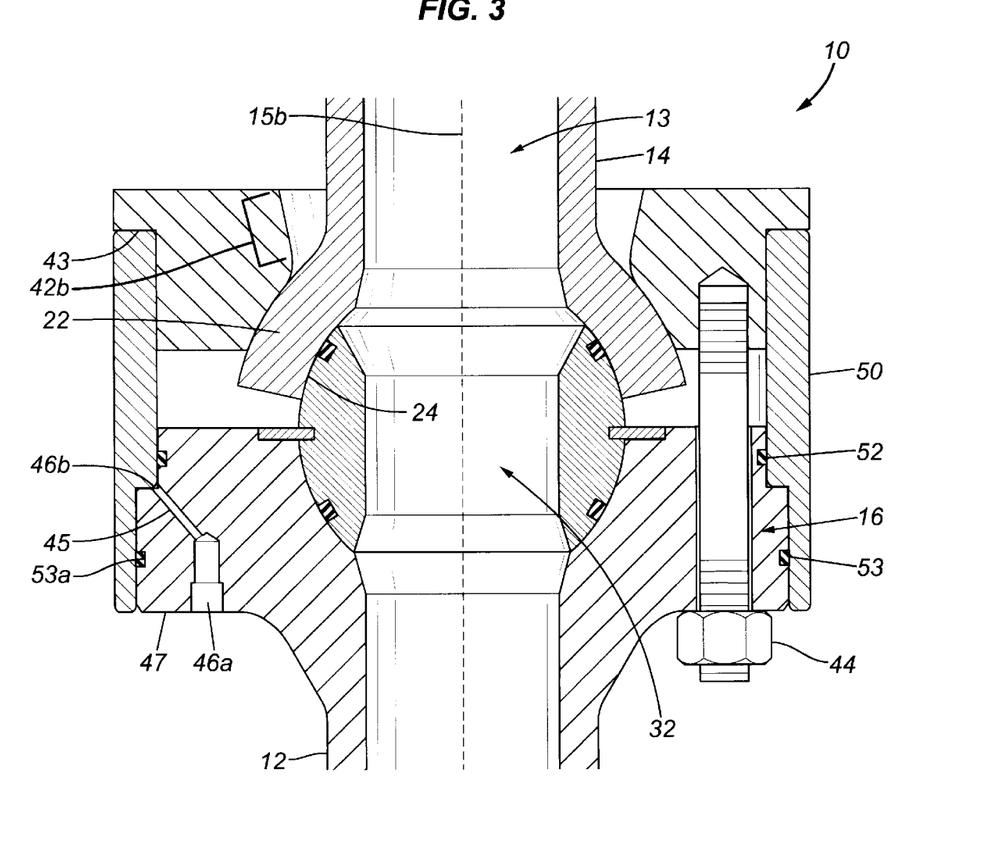
FIG. 3 is a view longitudinal cross section view of an articulated flowline connector used in the invention, wherein the flowlines connected thereby are fixed in coaxial aligned relationship.
Figure 4:
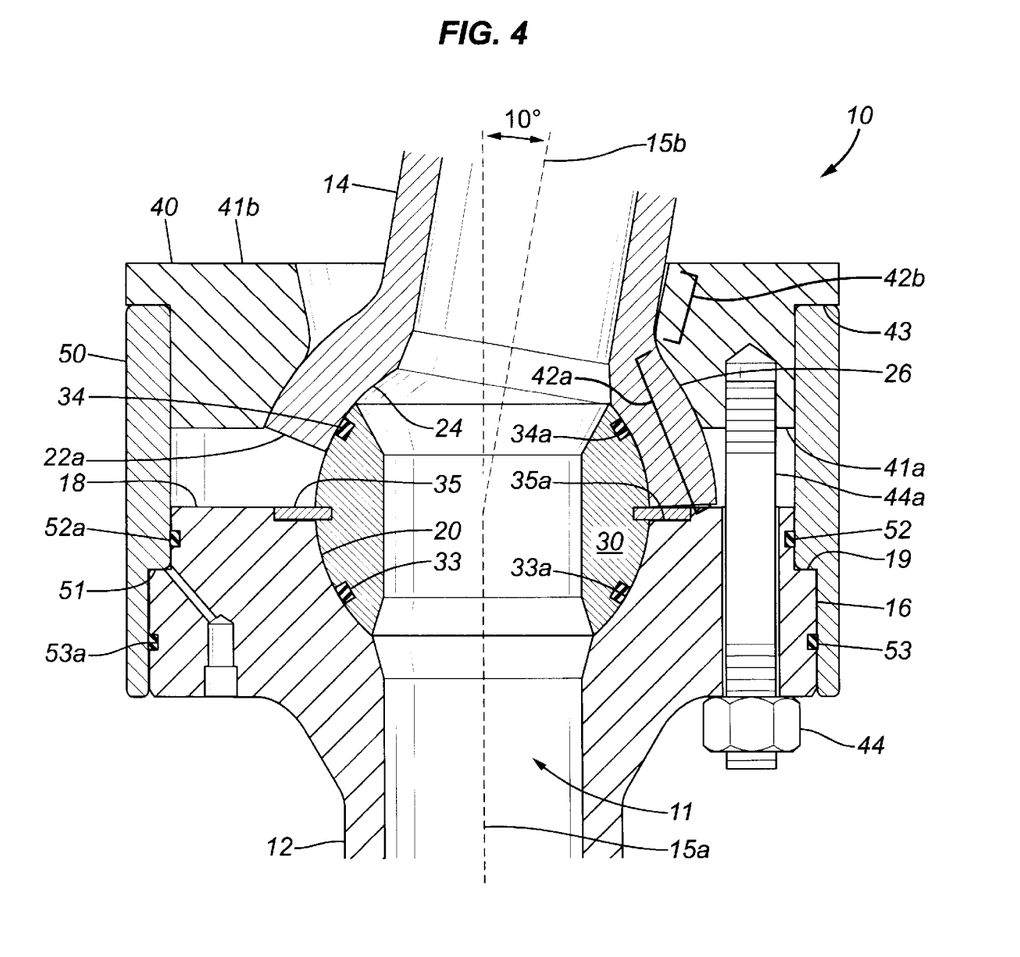
FIG. 4 is a view similar to FIG. 3 but showing the connected flowlines in an altered relationship made possible by pivotal adjustment of one of the flowlines of the connector of FIG. 3 with respect to the other.
Figure 5:
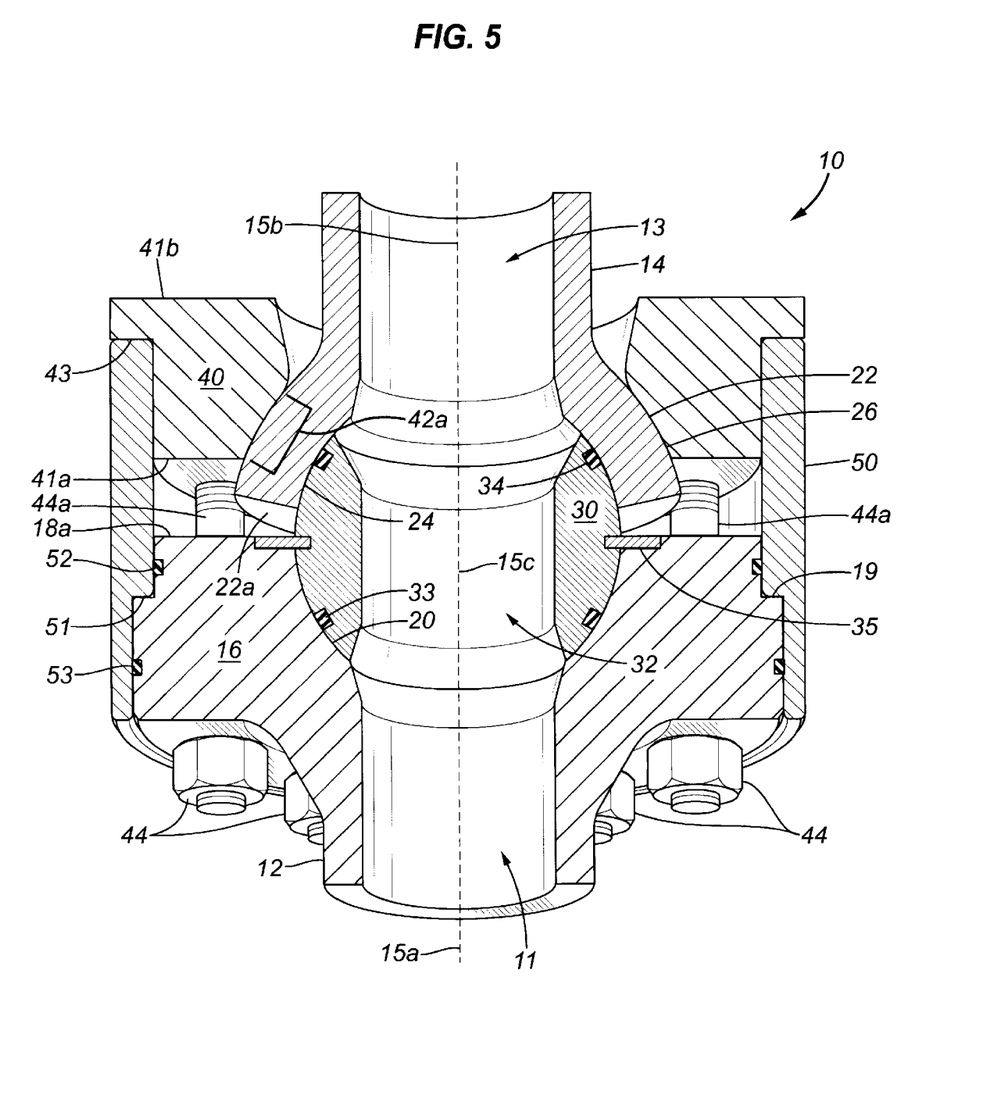
FIG. 5 is an enlarged fragmentary perspective view showing one of the wellhead connection assemblies included in the apparatus of FIGS. 3 and 4.

Referring more particularly to the drawings, in FIGS. 3 through 5, a connector apparatus 10 is shown in vertical cross section.

In each connector apparatus 10, the first flowline member 12 is provided with a longitudinal axis 15a, an axial flow passage 11, an external radial flange 16 at one end 18 and a receptacle cavity 20 formed in the end surface which is configured as the segment of a hemisphere formed coaxially in said one end. The second flowline member 14 is provided with a longitudinal axis 15b, an axial flow passage 13, an outwardly flaring end portion 22 and a second receptacle cavity 24 configured as a segment of a hemisphere in the transverse end surface at the flaring end thereof. An external surface 26 for the flaring end portion is formed as the segment of a sphere which is coaxial and concentric with the second receptacle surface but with a larger radius of curvature. A collar 40 is sleeved about the flaring end portion of the second flowline member in fluid-sealing engagement and is provided with an internal coaxial annular surface 42 having a first annular portion 42a matching the external surface of the flaring end portion and a second annular portion 42b with an internal diameter greater than the external diameter of the flowline member enclosed therein.

The connector 10 includes a ball 30 in the form of a segment of a sphere symmetrically formed about a diameter of the sphere. The ball 30 has a central axis 15c and an axial flow passage 32. The ball 30 is seated in the two receptacle cavities 20,24 with its flow passage in coaxial alignment with the longitudinal axes 15a, 15b of the two flowline members 12 and 14. It is to be noted that each of the ends of the axial flow passage 32 is enlarged by an outwardly diverging frusto-conical surface 31 a,3 1b respectively. The external spherical surface of the ball 30 has a radius of curvature which matches the radius of curvature of the two receptacle cavities 20, 24 so that its external surface engages and conforms with the internal annular surfaces of the two receptacle cavities and is in concentric relation therewith.

The ball member 30 is also provided with a pair of elastomer sealing rings 33, 34 which seat in annular grooves 33a, 34a formed in its external surface in coaxial relation to the axis 15c and in symmetrical orientation with respect to the transverse diameter of the ball 30. A third annular groove 35a is formed in the surface of the ball 30 in parallel relation to the grooves 33a, 34a and approximately midway therebetween. The groove 35a accommodates a split-ring metallic retainer 35 which projects from the surface of the ball and seats in the coaxial annular groove 35a which is formed in the end face 18a of the flowline member 12 and extends inwardly to open into the interior surface 20 of the member 11. The retainer ring 35 precludes any rotary movement of the ball 30 other than about its axis 15c and serves to maintain the coaxial alignment of the ball 30 and its axial flow passage 32 with the flowline member 12.

Figure 1:
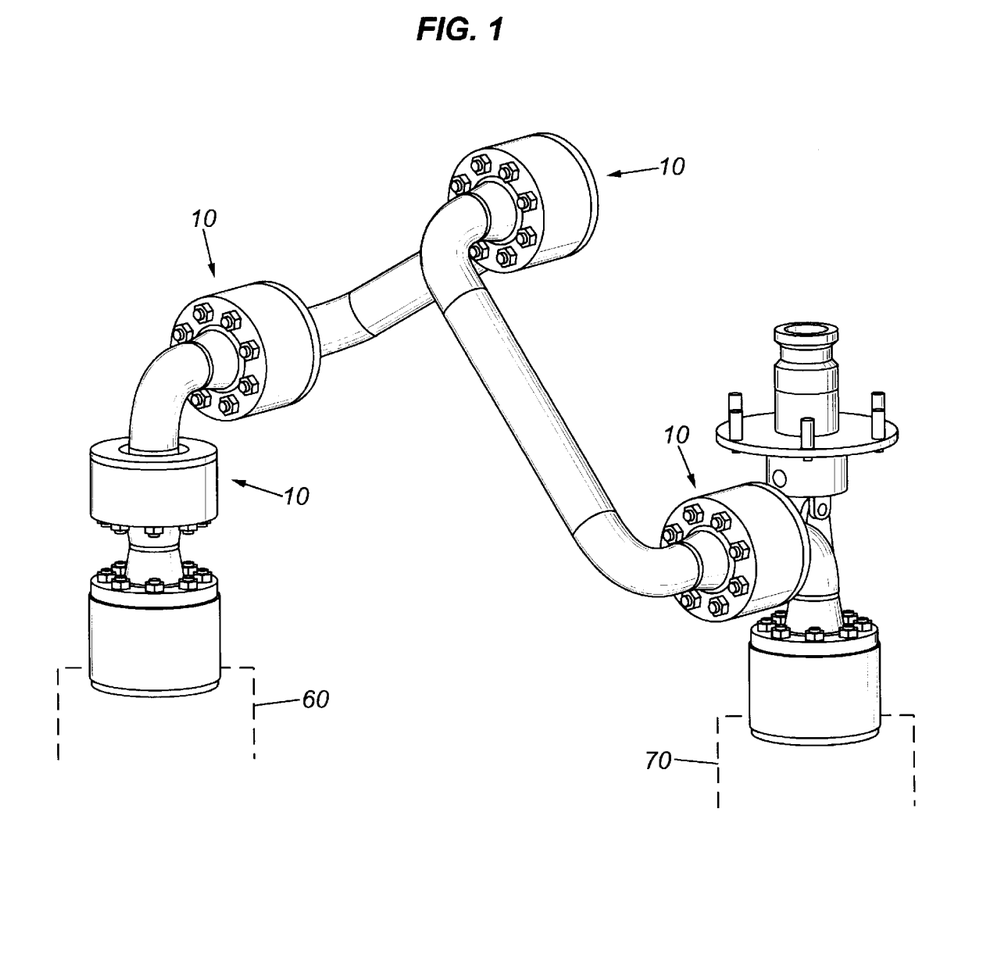
FIG. 1 is a perspective view of a pair of subsea wellheads, each equipped with a wellhead Christmas tree which is connected to an adjacent subsea manifold by an articulated wellhead connection assembly in accordance with the invention.

The apparatus 10 includes a collar 40 which seats on the flaring end portion 22 of the flowline member 14 and is positioned coaxial therewith. The collar 40 is provided with an interior annular surface 42 which includes a first annular portion 42a which extends to one end 41a of the collar and a second annular portion 42b which extends to the other end 41b of the collar. The annular curved surface portion 42a matches the curvature of the exterior surface 26 of the outwardly flaring end portion 22 of the flowline member 14 so that when the collar is seated, its annular surface portion 42a engaged the exterior surface 26 throughout. The upper annular portion 42b of the interior surface 42 as seen in FIG. 1 is substantially a frusto-conical surface which diverges outwardly to the end 41b. The taper of the surface portion 42b corresponds to the cone angle of its frusto-conical surface. The particular taper selected is predetermined to control the degree of potential pivotal movement of the flowline member 14 with respect to the flowline member 12.

The collar 40 is fixed to the flowline member 12 by a plurality of bolts 44, each provided with a bolt shaft 44a which extends through a bore formed in the flange 16 and with its threaded end received in a threaded blind bore in the collar 40. The bolts 44 are disposed with their shafts in parallel relation to the axes of the collar 40, the ball 30 and the flowline member 16. Preferably, they are also arranged in a circle in equiangular spaced relation to one another about the collar axis. When the bolts are tightened, the collar 40 clamps against the flowline member 12 which in turn clamps against the ball 30 and thereby maintains the flowline member 12 and 14 in a fixed relation.

The apparatus further includes a hydraulic drive means which comprises an annular piston 50 which is sleeved about the flange 16 of the flowline member 12 and extends beyond the end 18 of the member 12 to engage the collar 40.

The piston 50 is provided with an internal annular radial shoulder 51 which seats against an external annular shoulder 19 on the flange 16 and the end of the piston 50 engages an external radial shoulder 43 which is provided on the collar 40 and faces toward the flowline member 12.

The flange 16 is also provided with a second flow passage 45 which is offset from the flowline passage 11 and extends from an inlet port 46a formed in the radial shoulder 47 provided by the flange 16 and opens at an outlet 46b in the radial shoulder 10 which seats the piston 50. A fluid-tight sealing relationship is established between the piston and the flowline flange 16 by annular seals 52,53 which seat in accommodating coaxial grooves 52a, 53a formed in the exterior of the flange to extend cirumferentially about the flange. The grooves 52a, 53a lie on opposite sides of the shoulder 19 and therefore are in straddle relation to the hydraulic outlet 46b.

When it becomes desirable to alter the relationship of the flowline member 14 with respect to the flowline member 12, as for example to relieve strain in the pipeline or to establish a flowline between misaligned inlet and outlet members, hydraulic pressure can be delivered to the piston 50 by connection of a source of hydraulic pressure with an appropriate fitting (not shown) mounted in the inlet 46a. The hydraulic pressure supplied to the piston shoulder 51 is calculated so as to drive the piston against the collar 40 and apply a force thereto which acts in the axial direction of the collar 40 and thereby imposes an axially directed force on each of the bolts 44. The force is predetermined so as to stretch the bolts 44 by a limited amount which is sufficient to loosen the clamping relationship of the collar 40 and the flowline member 12 without losing the fluid-tight seal and without exceeding the yield strength and elastic limit of the bolts. Preferably, the force should be limited to apply a stress of 50% to 66% of the yield strength of the bolts. When the bolts 44 are stretched the predetermined amount, as for example in the range of 1 mm to 1.5 mm, the flowline member 14 can then be pivoted about the center point of the ball 30 and swivelled as necessary up to 360° of rotation in either direction to establish a desired orientation with respect to the flowline member 12. By virtue of the 10° of taper of the interior surface 41b of the collar 40, and also contact of the end face 22a of flowline member 14 with the end 18 of flowline member 12, pivotal movement of the flowline member 14 cannot exceed 10° in any given direction. It is to be understood, of course, that the taper of the surface 41b and the axial length of the flaring end portion 22 of flowline member 14 can be selected to allow for greater or smaller pivotal movement as may be desired.

With the current state of subsea oil field development as exemplified by the HOST system, each wellhead must be precisely oriented with respect to the hinged-over guidance structure on which it is installed and also with respect to the manifold system with which it is to be connected. Conventionally, a funnel-up guide is provided on the HOG and the adapter for the wellhead Christmas tree provided with three keys to mate with slots in the funnel guide. This procedure of guidance and installation is often very difficult, time-consuming, and expensive and because of the clearances involved there will almost always be considerable misalignment.

However, by means of an articulated flowline such as described above, precise orientation of the wellhead and manifold is not required. By means of a remotely operated vehicle (ROV), one segment of the flowline can be mated to a wellhead outlet and the segment at the other end of the flowline can be attached to an inlet of the manifold.

The several articulated connectors in the flowline can each be adjusted by remote controls for selectively applying hydraulic pressure to the connector and thereby configure the articulated flowline as necessary to accomplish connection of the wellhead with the manifold. A typical application of the method of the invention is illustrated generally in FIG. 1 in a subsea wellhead connection wherein four of the connectors 10 are installed in a flowline which conveys oil or gas from the wellhead 60 to a manifold 70. The use of more than one connector in a serial relation as shown enhances the flexibility of the flowline and its adaptability for installation between misaligned inlet and outlet members.

Figure 2:
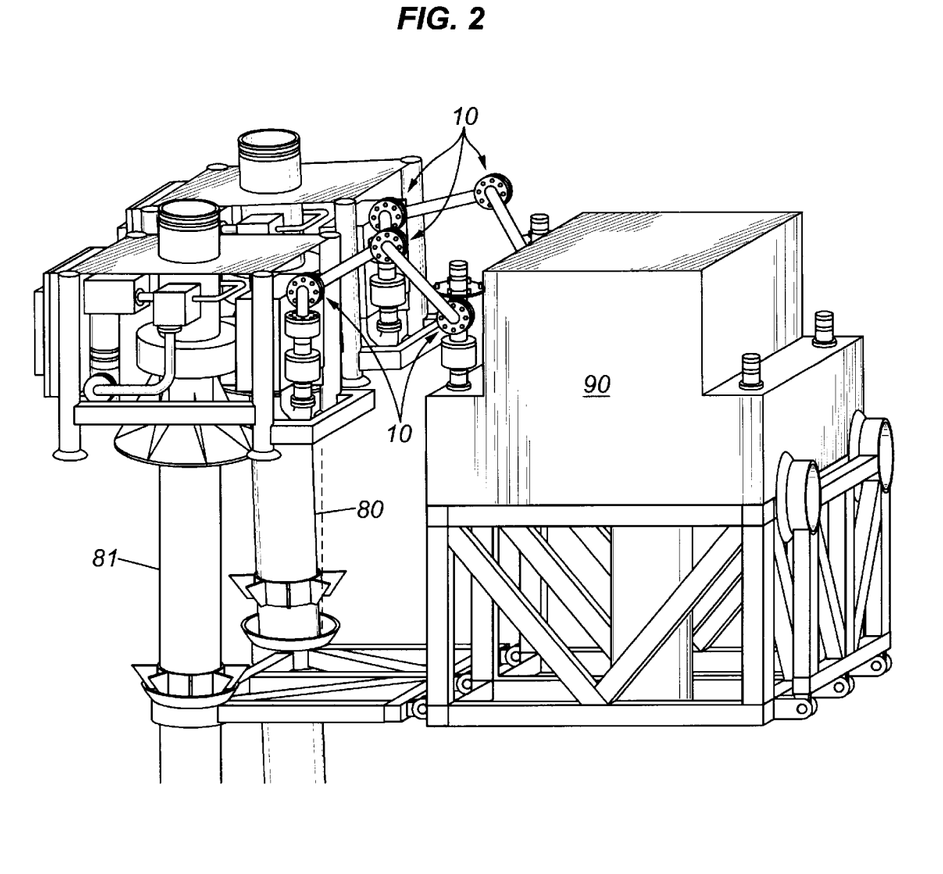
FIG. 2 is a side view of the apparatus of FIG. 1 and showing the subsea wellheads in misaligned relationship to one another and the adjacent manifold.

A more specific application of the method of the invention is illustrated in FIG. 2 wherein the method is used to connect an articulated flowline between a subsea wellhead and manifold wherein the wellhead 80 is in an out of vertical misaligned relation with respect to the manifold 90 in contrast with another wellhead 81 which is installed vertically.

Figure 6:
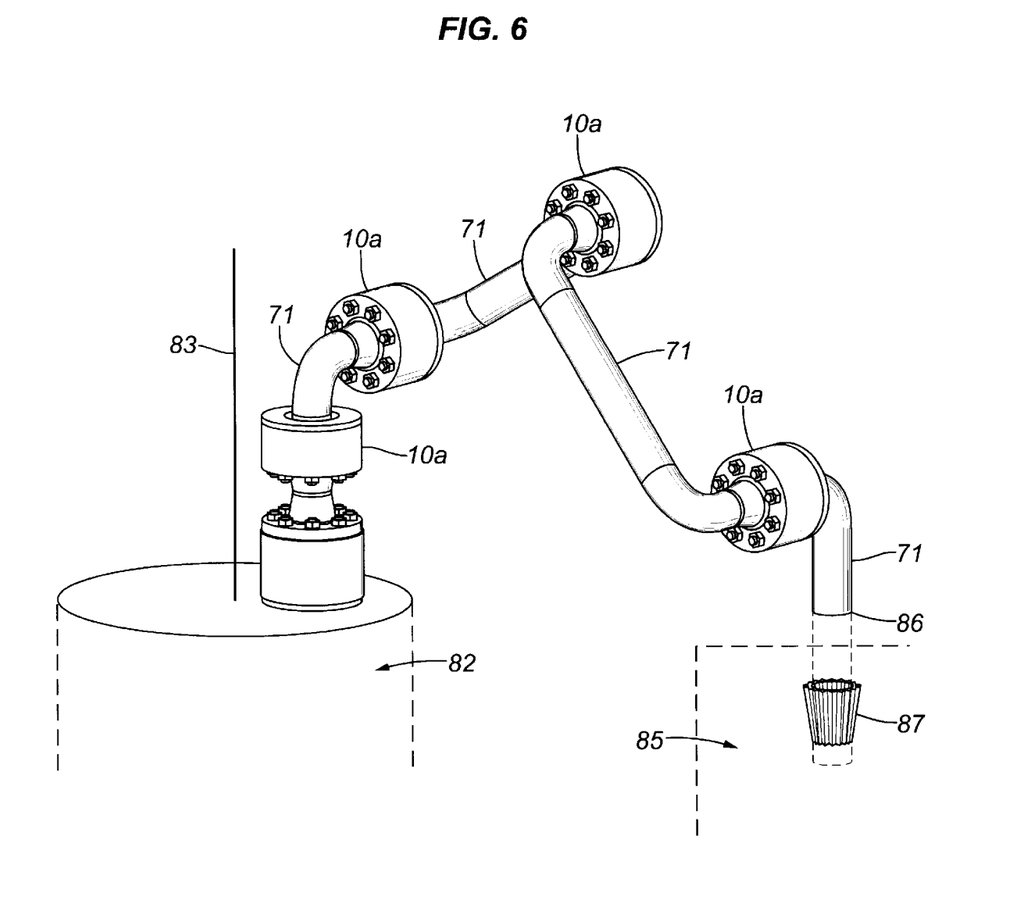
FIG. 6 is a schematic perspective view showing an articulated flowline attached to a wellhead and being lowered with the wellhead to a subsea position adjacent to a manifold for connection therewith.

An alternative, and preferred method for installing a flowline between a subsea wellhead and a manifold, is to attach one end of an articulated flowline to the wellhead before it is lowered to the sea floor. As shown in FIG. 6, an articulated flowline, comprising a series of flowline segments 71 which are serially connected by adjustable ball joint connectors 10A, such as a connector illustrated in FIGS. 3, 4 and 5, can then be lowered with the wellhead 82 on a wire line 83 to a subsea position near the manifold 85. With knowledge as to the relative orientation of the wellhead outlet and the manifold inlet, the flowline segments can be properly oriented with respect to one another before being lowered for installation.

When the wellhead is installed on a subsea well, the distal end 86 of the flowline can then be moved on a wire line or a running tool in the direction of the manifold to a position, as shown in FIG. 6 which is proximate to a collet connector 87 installed in communication with an inlet of the manifold. The end 86 of the flowline is then maneuvered into the collet connector for connecting thereto. It is also to be appreciated that the foregoing procedure can also be followed by first attaching the flowline to the manifold and then after being lowered with the manifold to the sea floor, be guided by a running tool to a collet connector installed on the subsea wellhead.

The method disclosed herein for installing a connection in a subsea well completion system is highly cost competitive when compared to conventional techniques. The articulated arm or flowline using adjustable ball joint connectors as described herein provides for a highly flexible flowline which eliminates the need for precision fabric tolerances in the various devices and installation guides as are necessary in a subsea system. The flowline connections with the wellhead and the manifold can also be designed to accommodate relatively large displacement variations, as for example one foot in any direction and five degrees in elevation or azimuth.

Accordingly, as a consequence, wells can be drilled with standard drilling practices with no concern for high alignment precision and without the very high costs that such precision requires.

It is to be understood that the foregoing description of the invention has been presented for purposes of illustration and explanation and is not intended to limit the invention to the precise procedures disclosed. For example, the sequential order of the method steps can be other than disclosed. It is to be appreciated therefore that various changes may be made by those skilled in the art without departing from the spirit of the invention.

What is claimed is:

1. A method for connecting a subsea wellhead with a subsea manifold by means of an articulated adjustable flowline, said method including the steps of:

providing a flowline comprising a plurality of flowline segments which are serially connected by adjustable ball joint connectors, each of which segments has a passage extending therethrough from end to end and each of which connectors includes a ball member of spherical segment configuration with an axial flow passage therethrough seated in a pair of receptacle cavities formed respectively by an annular surface formed in an externally flanged end of one of said segments and an annular surface formed in an outwardly flaring end of another of said segments with said ball member mounted in fluid tight sealing engagement with the cavity surfaces and its flow passage aligned with the passage of said one flowline segment, a plurality of bolts joining said flanged end of said another flowline segment to a collar sleeved about said externally flanged end and having a central axis aligned with the ball member axial passage and an internal collar surface of hemispherical segment configuration clamped by said bolts in engagement with the external surface of said flared end thereby fixing the two segments in a first position relative to one another and wherein said connector is provided with means for selectively applying a force less than the yield strength of said bolts to thereby stretch the bolts and allow articulated movement of said other segment with respect to said one flowline segment and to fix said segments in a second position relative to one another when said force is withdrawn, said method further including attaching one end of said flowline in communication with an outlet of said wellhead, and adjusting said ball joint connectors as necessary for attaching the other end of said flowline in communication with an inlet of said manifold, and attaching said other end of said flowline to said manifold inlet.

2. A method for connecting subsea wellhead with a subsea manifold by means of an articulated adjustable flowline, said method including the steps of:

providing a flowline comprising a plurality of flowline segments which are serially connected by adjustable ball joint connectors, each of which segments has a passage extending therethrough from end to end and each of which connectors includes a ball member of spherical segment configuration with an axial flow passage therethrough seated in a fair of receptacle cavities formed in the adjdacent ends of each pair of joined flowline segments with said ball member mounted in fluid tight sealing engagement with the cavity surfaces, means for joining said pair of flowline segments in a first fixed position relative to one another with the ball member axial passage aligned with the passage in one of said pair of flowline segments and in communication with the passage of the other flowline segment of said pair, and means for selectively applying a force to temporarily loosen the connector to allow articulated movement of said other flowline segment with respect to said one of said pair of segments and to fix said segments in a second position relative to one another when said force is withdrawn, said method further including attaching one end of said flowline in communication with an outlet of said wellhead, and re-orienting each pair of joined segments to one another by adjusting said ball joint connectors as necessary for attaching the other end of said flowline in communication with an inlet of said manifold, and attaching said other end of said flowline to said manifold inlet.

3. A method for providing a subsea wellhead connection with a subsea manifold by means of an articulated adjustable flowline, said method including the steps of:

(a) providing a flowline comprising a plurality of flowline segments which are serially connected by adjustable ball joint connectors, (b) connecting one end of said flowline to an outlet of a wellhead before the wellhead is installed, (c) lowering said wellhead with said flowline attached to a subsea well adjacent to said manifold and installing said wellhead on said well, (d) adjusting at least one of said ball joint connectors to loosen the connection between the flowline segments joined by said connector, (e) guiding said flowline with articulated movement of a flowline segment joined by said at least one ball joint connector whereby the other end of said flowline is positioned proximate to an inlet of said manifold, and (f) attaching the other end of said flowline to said manifold inlet.

4. A method of providing a subsea wellhead connection with a subsea manifold as set forth in claim 3 including the steps of:

determining theoretically the azimuth direction, distance and relative elevation of an outlet of said wellhead when installed with an inlet of said manifold prior to lowering the wellhead with said flowline attached to a position adjacent to said manifold, and prior to lowering said wellhead to its subsea position adjacent said wellhead adjusting said ball joint connectors as necessary for providing said flowline with a configuration suitable for connecting the wellhead with the manifold.

* * * * *

UNITED STATES PATENT AND TRADEMARK OFFICE
CERTIFICATE OF CORRECTION

PATENT NO.    : 6,003,604
DATED         : December 21, 1999
INVENTOR(S)   : Wilkins It is certified that error appears in the above-identified patent and that said Letters Patent is hereby corrected as shown below:

<u>Title page,</u>
Item [73], please delete "Kraerner", and insert -- Kvaerner -- therefore.

Signed and Sealed this

Seventeenth Day of December, 2002

JAMES E. ROGAN
*Director of the United States Patent and Trademark Office*